(12) United States Patent
Tsai et al.

(10) Patent No.: US 11,742,603 B2
(45) Date of Patent: Aug. 29, 2023

(54) INPUT/OUTPUT TRANSMISSION INTERFACE ASSEMBLY AND MOTHERBOARD MODULE INCLUDING THEREOF

(71) Applicants: Micro-Star Int'l Co., Limited., New Taipei (TW); MSI Computer (Shenzhen) Co., Ltd., Shenzhen (CN)

(72) Inventors: Tung-Yi Tsai, New Taipei (TW); Chung-Hsing Chang, New Taipei (TW); Kuo-Wei Lu, New Taipei (TW)

(73) Assignees: MICRO-STAR INT'L CO., LIMITED., New Taipei (TW); MSI COMPUTER (SHENZHEN) CO., LTD., Shenzhen (CN)

( * ) Notice: Subject to any disclaimer, the term of this patent is extended or adjusted under 35 U.S.C. 154(b) by 14 days.

(21) Appl. No.: 17/362,136

(22) Filed: Jun. 29, 2021

(65) Prior Publication Data
US 2022/0255253 A1    Aug. 11, 2022

(30) Foreign Application Priority Data
Feb. 5, 2021   (TW) ................................ 110201528

(51) Int. Cl.
*H01R 12/71*   (2011.01)
*H01R 12/73*   (2011.01)

(52) U.S. Cl.
CPC .................................. *H01R 12/732* (2013.01)

(58) Field of Classification Search
CPC .... H01R 12/732; H01R 12/735; H01R 12/73; H01R 12/72; H01R 12/716; H01R 12/712; H01R 12/71; H01R 12/51; H01R 12/50

USPC .......................................................... 439/65
See application file for complete search history.

(56) References Cited

U.S. PATENT DOCUMENTS

| | | | | |
|---|---|---|---|---|
| 5,195,897 A | * | 3/1993 | Kent | H01R 12/79 439/267 |
| 5,848,252 A | * | 12/1998 | Granau | G06F 13/4027 370/402 |
| 5,926,378 A | * | 7/1999 | DeWitt | H05K 1/14 710/301 |
| 5,956,378 A | * | 9/1999 | Soda | H03L 7/0997 375/376 |
| 6,222,739 B1 | * | 4/2001 | Bhakta | H01L 25/105 361/791 |

(Continued)

*Primary Examiner* — Harshad C Patel
(74) *Attorney, Agent, or Firm* — Muncy, Geissler, Olds & Lowe, P.C.

(57) ABSTRACT

An input/output transmission interface assembly capable of being assembled on a motherboard includes a first transmission interface, a board-to-board connector, and a second transmission interface. The first transmission interface includes a first circuit board, a first electrical connector, a driving chip, and a plug portion. The plug portion is at one side of the first circuit board for being plugged into the motherboard. The second transmission interface includes a second circuit board and a second electrical connector. The second circuit board is substantially parallel to the first circuit board. The board-to-board connector is assembled on and between the first circuit board and the second circuit board. The first circuit board and the second circuit board are electrically connected with each other through the board-to-board connector.

9 Claims, 4 Drawing Sheets

(56) References Cited

U.S. PATENT DOCUMENTS

| | | | | |
|---|---|---|---|---|
| 6,324,071 B2* | 11/2001 | Weber | | H05K 1/144 |
| | | | | 439/74 |
| 6,551,131 B1* | 4/2003 | Kuo | | H01R 13/24 |
| | | | | 439/541.5 |
| 6,572,403 B2* | 6/2003 | Reimund | | H01R 25/006 |
| | | | | 439/507 |
| 6,590,781 B2* | 7/2003 | Kollipara | | G11C 5/00 |
| | | | | 174/250 |
| 6,927,974 B2* | 8/2005 | Robillard | | H05K 7/1492 |
| | | | | 439/246 |
| 6,966,784 B2* | 11/2005 | Van Schuylenbergh | | |
| | | | | H05K 1/147 |
| | | | | 439/329 |
| 7,168,961 B2* | 1/2007 | Hsieh | | H01R 12/725 |
| | | | | 439/74 |
| 7,442,076 B2* | 10/2008 | Huang | | H01R 13/641 |
| | | | | 439/502 |
| 7,503,773 B2* | 3/2009 | Tokunaga | | H01R 13/6585 |
| | | | | 439/74 |
| 8,007,327 B2* | 8/2011 | Yang | | H01R 13/2464 |
| | | | | 439/862 |
| 8,432,705 B2* | 4/2013 | Ge | | G06F 1/185 |
| | | | | 361/728 |
| 8,949,509 B2* | 2/2015 | Schuette | | G06F 3/0688 |
| | | | | 711/103 |
| 9,325,086 B2* | 4/2016 | Brodsky | | H01R 12/716 |
| 10,763,606 B1* | 9/2020 | Esmaily | | H01R 13/5219 |
| 10,903,594 B2* | 1/2021 | Herring | | H01R 12/725 |
| 11,398,694 B2* | 7/2022 | Henry | | H01R 13/627 |
| 2002/0034068 A1* | 3/2002 | Weber | | H05K 1/144 |
| | | | | 361/720 |
| 2006/0009048 A1* | 1/2006 | Hsieh | | H05K 1/147 |
| | | | | 439/65 |
| 2006/0067066 A1* | 3/2006 | Meier | | G06F 1/189 |
| | | | | 439/493 |
| 2014/0024261 A1* | 1/2014 | Xu | | H01R 24/76 |
| | | | | 439/638 |
| 2014/0273852 A1* | 9/2014 | McCormack | | H04W 76/14 |
| | | | | 455/41.2 |
| 2021/0096614 A1* | 4/2021 | Hsieh | | G06F 13/409 |

\* cited by examiner

INPUT/OUTPUT TRANSMISSION INTERFACE ASSEMBLY AND MOTHERBOARD MODULE INCLUDING THEREOF

CROSS-REFERENCE TO RELATED APPLICATION

This non-provisional application claims priority under 35 U.S.C. § 119(a) to Patent Application No. 110201528 filed in Taiwan, R.O.C. on Feb. 5, 2021, the entire contents of which are hereby incorporated by reference.

BACKGROUND

Technical Field

The present disclosure relates to computer fields. In particular, the present disclosure relates to an input/output transmission interface assembly and a motherboard module including thereof.

Related Art

The connection and transmission interface of Thunderbolt 3 usually uses a USB type-C electrical connector as the main specification for connection and transmission. However, its previous generation products adopted Mini DisplayPort (Mini DP) as their connection and transmission interface. In addition to the backward compatibility issue for the electrical connector, since various peripheral products nowadays, such as monitors, projectors, network cards, etc., have not completely unified the interface for connection and transmission yet, a corresponding interface is still used for providing the display signal source to the Thunderbolt chip. Therefore, if the computer or the device only equips with Thunderbolt interface (or only Thunderbolt interface is left), it may be necessary to install an additional adapter, which causes inconvenience to the user.

SUMMARY

Currently, electrical connectors are usually directly welded on the motherboard. Thus, more electrical connectors need more spaces on the motherboard for welding. In addition, the interface of Thunderbolt 3 also needs to be accompanied with a driving chip, which takes up the space on the motherboard as well. In some designs known to the inventor the electrical connectors can be disposed independently on another circuit board, and the another circuit board can be served as an expansion card to be plugged into the PCI-E slot, thereby reducing the needed space on the motherboard. However, since the performance requirement of a graphics card is increasing nowadays, a graphics card usually equips with an independent fan, which not only makes itself inconvenient to be installed into the PCI-E slot, but also affects the expandability of the motherboard to other PCI-E cards through the PCI-E slot.

In order to solve the aforementioned problem(s), a general embodiment of the present disclosure provides an input/output transmission interface assembly. The input/output transmission interface assembly is capable of being assembled on a motherboard, and includes a first transmission interface, a board-to-board connector, and a second transmission interface.

The first transmission interface includes a first circuit board, a first electrical connector, a driving chip, and a plug portion. the at least one first electrical connector and the driving chip are fixed on the first circuit board, and are electrically connected with each other through the first circuit board. The plug portion is at one side of the first circuit board for being plugged into the motherboard. The second transmission interface includes a second circuit board and a second electrical connector. The second circuit board is substantially parallel to the first circuit board, and the second electrical connector is fixed to the second circuit board. The board-to-board connector is assembled on the first circuit board and the second circuit board, and the board-to-board connector is assembled between the first circuit board and the second circuit board. The board-to-board connector extends in a direction substantially perpendicular to the first circuit board and the second circuit board. The first circuit board and the second circuit board are electrically connected with each other through the board-to-board connector.

In some embodiments, the at least one first electrical connector is a USB type-C electrical connector or a USB 3.2 electrical connector.

In some embodiments, the at least one second electrical connector is a Mini DP electrical connector.

In some embodiments, the at least one second electrical connector is a Displayport electrical connector.

In some embodiments, the input/output transmission interface assembly comprises a plurality of the first electrical connector and a plurality of the second electrical connectors. The first electrical connectors and the second electrical connectors are parallelly disposed on the first circuit board and the second circuit board, respectively.

More specifically, the number of the first electrical connectors and the number of the second electrical connectors are the same.

In some embodiments, the number of the first electrical connectors and the number of the second electrical connectors are not the same.

In some embodiments, the second transmission interface further includes a fixation seat. The fixation seat is at one side of the second circuit board, and the second circuit board is capable of being fixed on the motherboard through the fixation seat.

In some embodiments, the input/output transmission interface assembly further includes a connection post connected between the first circuit board and the second circuit board.

In some embodiments, the board-to-board connector comprises a plug end and a receptacle end. The plug end is fixed to the first circuit board, the receptacle end is fixed to the second circuit board, and the plug end and the receptacle end are assembled with each other.

Here, a motherboard module is further provided. The motherboard module is disposed with a central processing unit and a platform controller hub (PCH) chip. The motherboard module includes a motherboard and an input/output transmission interface assembly. The motherboard has a high-speed electrical connector, and an input/output port fixation area and a PCI-E receptacle area are defined on the motherboard. The high-speed electrical connector is disposed in the input/output port fixation area. A driving signal generated by the central processing unit or by the PCH chip is capable of being transmitted to the PCI-E receptacle area and the high-speed electrical connector in the input/output port fixation area. The plug portion of the first transmission interface of the input/output transmission interface assembly is connected to the high-speed electrical connector.

It can be understood from one or some embodiments of the present disclosure that, since the driving chip, the first electrical connector, and the second electrical connector in the provided input/output transmission interface assembly are removed from the motherboard and are disposed on the independent circuit board, the space on the motherboard can be released. Moreover, the PCI-E slot may not be used. As a result, the design of the motherboard can be more flexible, and it can be more convenient for the user to use a device having the motherboard module, to connect another device with the device having the motherboard module, or to further expand the device having the motherboard module.

BRIEF DESCRIPTION OF THE DRAWINGS

The disclosure will become more fully understood from the detailed description given herein below for illustration only, and thus not limitative of the disclosure, wherein.

DETAILED DESCRIPTION

It should be understood that, in the following description, when an element is referred to as being "on", "connected to", or "coupled to" another element, it may be directly on, connected to, or coupled to the other element, or one or more intervening elements may also be present. In addition, it will be understood that, although the terms "first", "second", "third", etc. may be used herein to describe various elements, components, regions, and/or sections, these terms are only used to distinguish these elements, components, regions, and/or sections, rather than are used to represent the definite order of these elements, components, regions, and/or sections. Moreover, spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. In other words, these terms only represent a relative position relationship between the described components, not an absolute position relationship between the described components.

Figure 1:
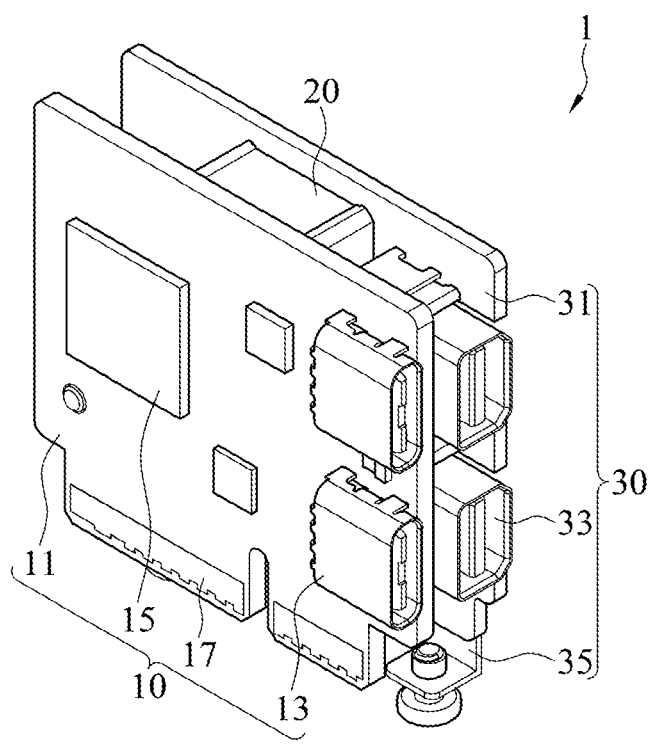
FIG. 1 illustrates a schematic perspective view of an input/output transmission interface assembly according to a first embodiment of the present disclosure.
Figure 2:
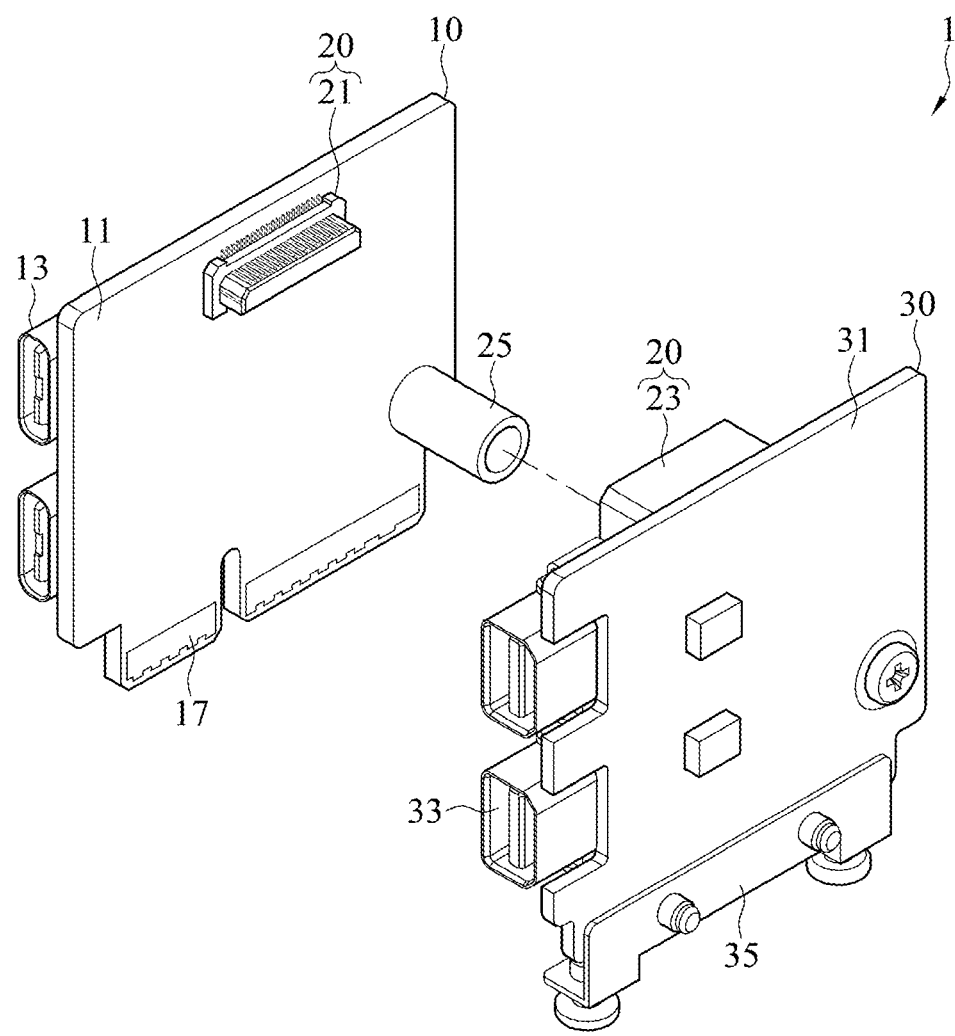
FIG. 2 illustrates a schematic exploded view of the input/output transmission interface assembly according to the first embodiment of the present disclosure.
Figure 5:
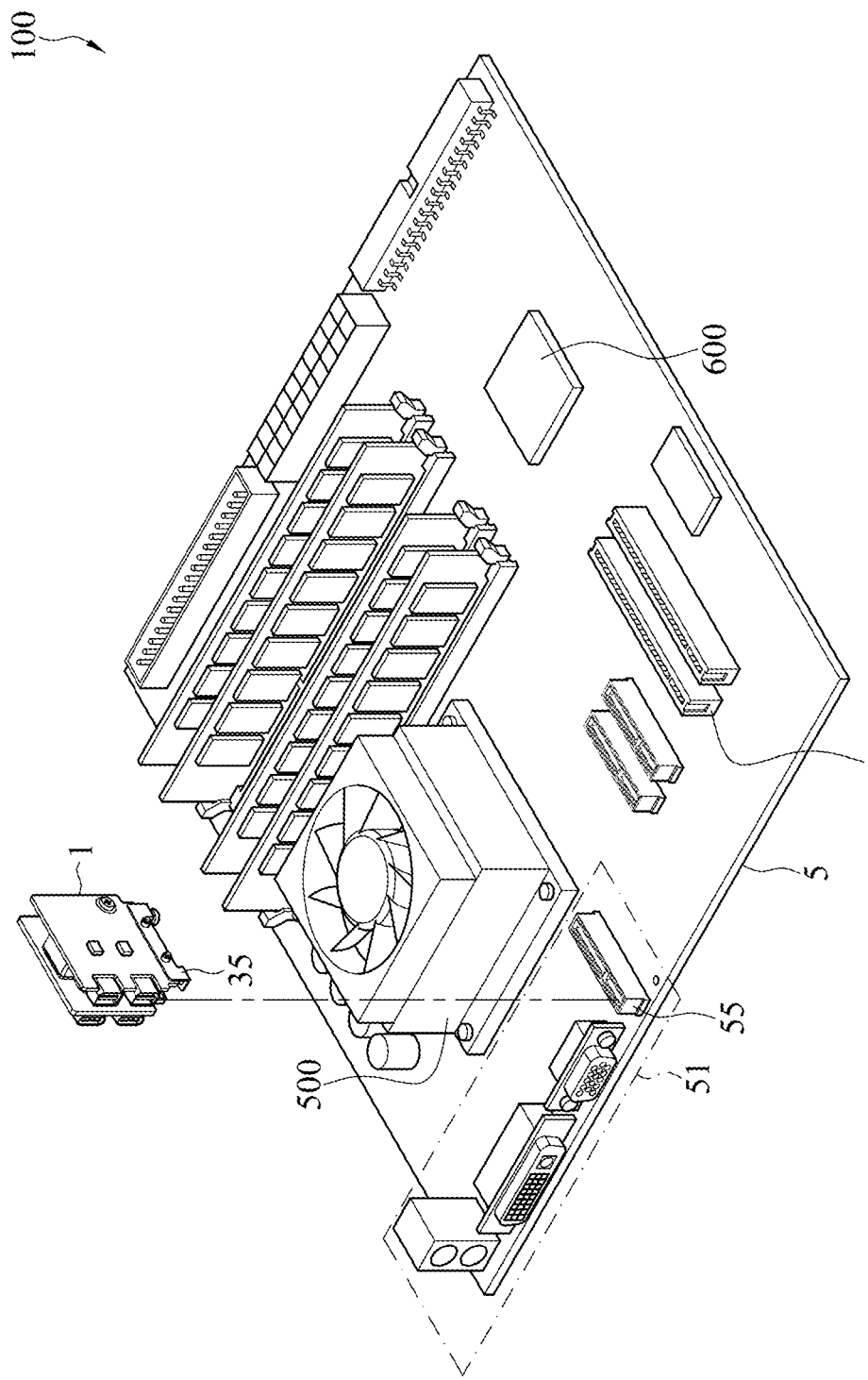
FIG. 5 illustrates a schematic exploded view of a motherboard module according to an exemplary embodiment of the present disclosure.

FIG. 1 illustrates a schematic perspective view of an input/output transmission interface assembly 1 according to a first embodiment of the present disclosure. FIG. 2 illustrates a schematic exploded view of the input/output transmission interface assembly 1 according to the first embodiment of the present disclosure. As shown in FIG. 1 and FIG. 2, an input/output transmission interface assembly 1 is provided. The input/output transmission interface assembly 1 is capable of being assembled on the motherboard 5 (as shown in FIG. 5). The input/output transmission interface assembly 1 includes a first transmission interface 10, a board-to-board connector 20, and a second transmission interface 30.

In this embodiment, the first transmission interface 10 includes a first circuit board 11, a first electrical connector 13, a driving chip 15, and a plug portion 17. The first electrical connector 13 and the driving chip 15 are fixed on the first circuit board 11, and are electrically connected with each other through the first circuit board 11. The plug portion 17 is at one side of the first circuit board 11 for being plugged into a port on the motherboard 5. In this embodiment, the plug portion 17 may be a protruding end with gold fingers. The second transmission interface 30 includes a second circuit board 31 and a second electrical connector 33. The second circuit board 31 is substantially parallel to the first circuit board 11, and the second electrical connector 33 is fixed to the second circuit board 31. The board-to-board connector 20 is assembled on the first circuit board 11 and the second circuit board 31, and the board-to-board connector 20 is assembled between the first circuit board 11 and the second circuit board 31 as well. The board-to-board connector 20 extends in a direction substantially perpendicular to the first circuit board 11 and the second circuit board 31. The first circuit board 11 and the second circuit board 31 are electrically connected with each other through the board-to-board connector 20. More specifically, the first electrical connector 13 extends in a direction substantially parallel to the first circuit board 11, and the second electrical connector 33 extends in a direction substantially parallel to the second circuit board 31.

More specifically, in this embodiment, the board-to-board connector 20 includes a plug end 21 and a receptacle end 23. The plug end 21 is fixed to the first circuit board 11, and the receptacle end 23 is fixed to the second circuit board 31. The plug end 21 and the receptacle end 23 can be assembled with each other; however, this is only an example, not a limitation. For example, the positions of the plug end 21 and the receptacle end 23 can be exchanged; alternatively, in one embodiment, the board-to-board connector 20 may also be a single component.

According to one or some embodiments, by respectively disposing the first electrical connector 13 and the second electrical connector 33 on the first circuit board 11 and the second circuit board 31, the electrical connector interfaces can be arranged in a manner perpendicular to the motherboard 5. Moreover, the driving chip 15 which should be originally disposed on the motherboard 5 can be alternatively disposed on the first circuit board 11 as well, thereby releasing large space on the motherboard 5, which can be used to dispose other chips, so that the overall functions of the motherboard 5 can be improved.

Please still refer to FIG. 1 and FIG. 2, in some embodiments, the second transmission interface 30 further includes a fixation seat 35. The fixation seat 35 is at one side of the second circuit board 31, and the fixation seat 35 is roughly at the same horizontal line as the plug portion 17. The fixation seat 35 has an opening for being fixed onto the motherboard 5. The fixation seat 35 can provide the second transmission interface 30 with more stable connection to the motherboard 5, thereby effectively avoiding falling off the second transmission interface 30 caused by shaking when an external force is applied to the input/output transmission interface assembly 1. Moreover, a connection post 25 is further disposed between the first circuit board 11 and the second circuit board 31. The connection post 25 is connected between the first circuit board 11 and the second circuit board 31 so as to make the whole mechanical structure much firm.

In the first embodiment, the first electrical connector 13 is a USB type-C (USB 3.1) electrical connector or a USB 3.2 electrical connector, and the second electrical connector 33 is a Mini DP electrical connector. Therefore, backward compatibility can be achieved. Moreover, the number of the first electrical connectors 13 and the number of the second electrical connectors 33 may be the same. In this embodiment, as an example, the number of the first electrical connectors 13 and the number of the second electrical connectors 33 are both two. It should be noted that, the above is merely provided as an example, and the present disclosure is not limited thereto.

Figure 3:
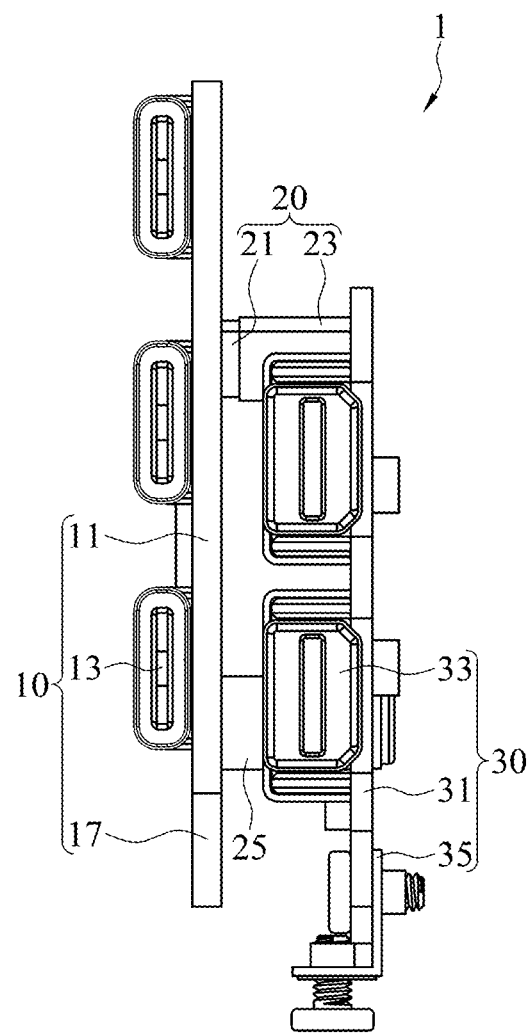
FIG. 3 illustrates a schematic side view of an input/output transmission interface assembly according to a second embodiment of the present disclosure.

FIG. 3 illustrates a schematic side view of an input/output transmission interface assembly 1 according to a second embodiment of the present disclosure. As shown in FIG. 3, and please refer to FIG. 1 and FIG. 2 at the same time, one of the differences between the second embodiment and the first embodiment is that, the input/output transmission interface assembly 1 in the second embodiment has three USB type-C electrical connectors and one Mini DP electrical connector. In other words, in this embodiment, the number of the first electrical connectors 13 and the number of the second electrical connectors 33 are different with each other. The consideration is that when the USB type-C interfaces are more common in the peripheral devices, the number of the first electrical connectors 13 can be increased, and/or the number of the second electrical connectors 33 can be reduced.

Figure 4:
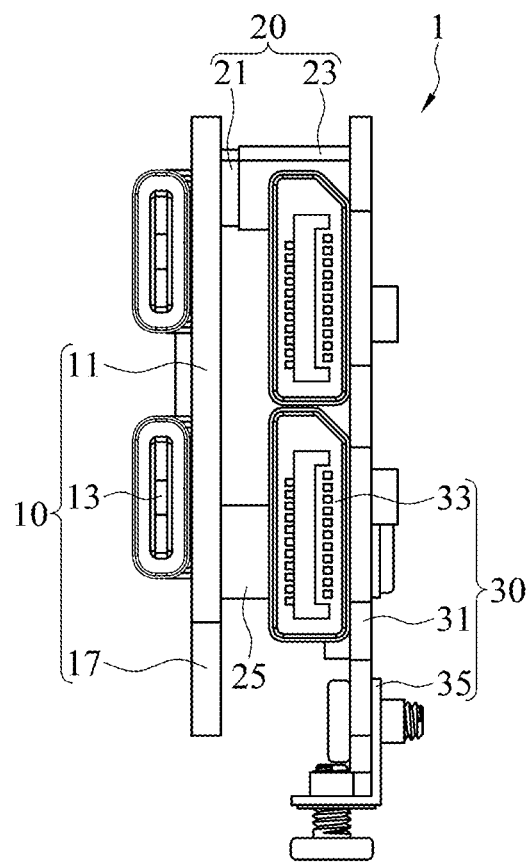
FIG. 4 illustrates a schematic side view of an input/output transmission interface assembly according to a third embodiment of the present disclosure.

FIG. 4 illustrates a schematic side view of an input/output transmission interface assembly 1 according to a third embodiment of the present disclosure. As shown in FIG. 4, and please refer to FIG. 1 and FIG. 2 at the same time, one of the differences between the third embodiment and the first embodiment is that, the second electrical connectors 33 of the input/output transmission interface assembly 1 in the third embodiment are Displayport electrical connectors. That is, in this embodiment, the Displayport electrical connectors can be integrated with the products having the Thunderbolt interface.

FIG. 5 illustrates a schematic exploded view of a motherboard module 100 according to an exemplary embodiment of the present disclosure. In this embodiment, as shown in FIG. 5, a motherboard module 100 including the input/output transmission interface assembly 1 mentioned above is further provided. The motherboard module 100 is equipped with a central processing unit 500 and a platform controller hub (PCH) chip 600. The motherboard module 100 includes a motherboard 5 and an input/output transmission interface assembly 1. The motherboard 5 has a high-speed electrical connector 55, and an input/output port fixation area 51 and a PCI-E receptacle area 53 are defined on the motherboard 5. The high-speed electrical connector 55 is disposed in the input/output port fixation area 51. In this embodiment, the high-speed electrical connector 55 is electrically connected to the central processing unit 500 or the PCH chip 600 on the motherboard module 100, so that the driving signal (PCI-E signal) generated by the central processing unit 500 or the PCH chip 600 can be respectively transmitted to the PCI-E receptacle area 53 and/or to the high-speed electrical connector 55 in the input/output port fixation area 51, through the transmission channel of the PCI-E receptacle area 53 on the motherboard 5 and the transmission channel of the input/output port fixation area 51 on the motherboard 5. By this arrangement, the PCI-E receptacle area 53 can be vacated. However, the above is merely provided as an example, and the present disclosure is not limited thereto. In fact, in some embodiments, the central processing unit 500 or PCH chip 600 can transmit the PCI-E signal to the high-speed electrical connector 55 or input/output port fixation area 51 through a conversion chip (for example, a switch IC, a PCI-E/USB Hub IC, and a Re-driver IC).

To sum up, according to one or some embodiments of the present disclosure, by removing the driving chip 15, the first electrical connector 13, and the second electrical connector 33 from the motherboard 5 and disposing these components to another independent circuit board, and arranging the interfaces in a manner perpendicular to the motherboard 5, the space on the motherboard 5 can be released. Moreover, the PCI-E slot may not be used. As a result, the design of the motherboard can be more flexible, and it can be more convenient for the user to use a device having the motherboard module, to connect another device with the device having the motherboard module, or to further expand the device having the motherboard module.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An input/output transmission interface assembly provided for being assembled on a motherboard, comprising:
 a first transmission interface comprising a first circuit board, at least one first electrical connector, a driving chip, and a plug portion, wherein the at least one first electrical connector and the driving chip are fixed on the first circuit board, and are electrically connected with each other through the first circuit board, and wherein the plug portion is at one side of the first circuit board for being plugged into the motherboard, and wherein the at least one first electrical connector extends in a direction substantially parallel to the first circuit board;
 a second transmission interface comprising a second circuit board at least one second electrical connector and a fixation seat, wherein the second circuit board is substantially parallel to the first circuit board, wherein the at least one second electrical connector is fixed on the second circuit board, and wherein the at least one second electrical connector extends in a direction substantially parallel to the second circuit board, and wherein the fixation seat is at one side of the second circuit board, and wherein the second circuit board is provided for being fixed on the motherboard through the fixation seat; and
 a board-to-board connector assembled on and between the first circuit board and the second circuit board, wherein the board-to-board connector extends in a direction substantially perpendicular to the first circuit board and the second circuit board, and wherein the first circuit board and the second circuit board are electrically connected with each other through the board-to-board connector.

2. The input/output transmission interface assembly according to claim 1, wherein the input/output transmission interface assembly comprises a plurality of the first electrical connector and a plurality of the second electrical connectors, wherein the first electrical connectors and the second electrical connectors are parallelly disposed on the first circuit board and the second circuit board, respectively.

3. The input/output transmission interface assembly according to claim 2, wherein a number of the first electrical connectors and a number of the second electrical connectors are the same.

4. The input/output transmission interface assembly according to claim 1, wherein a number of the first electrical connectors and a number of the second electrical connectors are not the same.

5. The input/output transmission interface assembly according to claim 1, further comprising a connection post connected between the first circuit board and the second circuit board.

6. The input/output transmission interface assembly according to claim 1, wherein the board-to-board connector comprises a plug end and a receptacle end, and wherein the plug end is fixed to the first circuit board, the receptacle end is fixed to the second circuit board, and the plug end and the receptacle end are assembled with each other.

7. The input/output transmission interface assembly according to claim 1, wherein the board-to-board connector comprises a plug end and a receptacle end, and wherein the plug end is fixed to the second circuit board, the receptacle end is fixed to the first circuit board, and the plug end and the receptacle end are assembled with each other.

8. A motherboard module disposed with a central processing unit and a platform controller hub (PCH) chip, comprising:
 a motherboard having a high-speed electrical connector, wherein an input/output port fixation area and a PCI-E receptacle area are defined on the motherboard, wherein the high-speed electrical connector is disposed in the input/output port fixation area, and wherein a driving signal generated by the central processing unit or by the PCH chip is capable of being transmitted to the PCI-E receptacle area and the high-speed electrical connector in the input/output port fixation area; and
 an input/output transmission interface assembly according to claim 1, wherein the plug portion of the first transmission interface is connected to the high-speed electrical connector.

9. The input/output transmission interface assembly according to claim 1, wherein the at least one first electrical connector and the at least one second electrical connector are different kinds of electrical connectors.

\* \* \* \* \*